US007350399B2

(12) United States Patent
Kobayashi et al.

(10) Patent No.: US 7,350,399 B2

(45) Date of Patent: Apr. 1, 2008

(54) LEAKAGE DETECTING DEVICE FOR EVAPORATING FUEL PROCESSING APPARATUS

(75) Inventors: Mitsuyuki Kobayashi, Susono (JP); Yoshichika Yamada, Kuwana (JP); Masao Kano, Gamagori (JP); Koichi Inagaki, Aichi-gun (JP)

(73) Assignee: Denso Corporation (JP)

( * ) Notice: Subject to any disclaimer, the term of this patent is extended or adjusted under 35 U.S.C. 154(b) by 70 days.

(21) Appl. No.: 11/183,742

(22) Filed: Jul. 19, 2005

(65) Prior Publication Data

US 2006/0016253 A1 Jan. 26, 2006

(30) Foreign Application Priority Data

Jul. 22, 2004 (JP) ............................. 2004-214798

(51) Int. Cl.
*G01M 3/04* (2006.01)

(52) U.S. Cl. ....................................................... 73/49.7

(58) Field of Classification Search .................. 73/49.7
See application file for complete search history.

(56) References Cited

U.S. PATENT DOCUMENTS 3,985,467 A * 10/1976 Lefferson ..................... 417/20
4,063,824 A * 12/1977 Baker et al. .................. 417/43
5,073,091 A * 12/1991 Burgess et al. .......... 417/222.1
5,673,732 A * 10/1997 Kenney et al. ............... 141/59
5,890,474 A 4/1999 Schnaibel et al.
6,074,170 A * 6/2000 Bert et al. ................. 417/44.2
6,109,311 A * 8/2000 Fournier et al. .............. 141/59
6,314,793 B1 * 11/2001 Webb et al. ................. 73/40.7
6,679,111 B2 * 1/2004 Shigihama et al. ........ 73/118.1
6,993,957 B2 * 2/2006 Kano et al. .................. 73/49.7
7,004,013 B2 * 2/2006 Kobayashi et al. .......... 73/49.7
7,083,392 B2 * 8/2006 Meza et al. ................ 417/44.2
2002/0094277 A1 * 7/2002 Gaudet et al. ............. 417/44.1
2004/0000187 A1 1/2004 Kobayashi et al.
2004/0126243 A1 * 7/2004 Sievert et al. ............. 417/44.2
2004/0149016 A1 8/2004 Kano et al.

* cited by examiner

*Primary Examiner*—Michael Cygan
(74) *Attorney, Agent, or Firm*—Nixon & Vanderhye PC

(57) ABSTRACT

A leakage detecting device is connected to an evaporating fuel processing apparatus to detect leakage of evaporating fuel in a ventilation apparatus that includes an electric pump, a fuel tank, and a filter. The electric pump includes a pump portion and a motor portion. The pump portion is capable of generating at least one of pressurizing force and de-pressurizing force. The motor portion drives the pump portion. The filter absorbs fuel evaporating in the fuel tank. The leakage detecting device generates pressure difference between the inside of the ventilation apparatus and the outside of the ventilation apparatus in accordance with the pressurizing force and the de-pressurizing force generated using the electric pump to detect a leakage condition of the ventilation apparatus. The leakage detecting device includes a rotation speed controlling means that controls rotation speed of the motor portion at a predetermined rotation speed.

20 Claims, 5 Drawing Sheets

FIG. 5
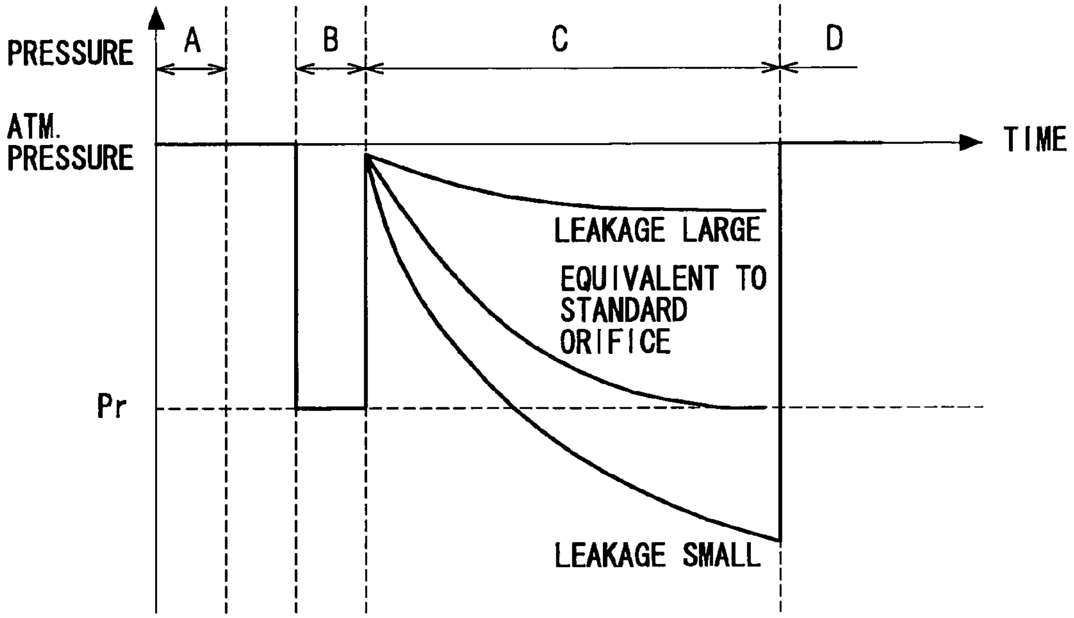
FIG. 6
| PROCESS | MOTOR | SWITCHING VALVE |
|---|---|---|
| A | OFF | OFF |
| B | ON | OFF |
| C | ON | ON |
| D | OFF | OFF |
FIG. 7
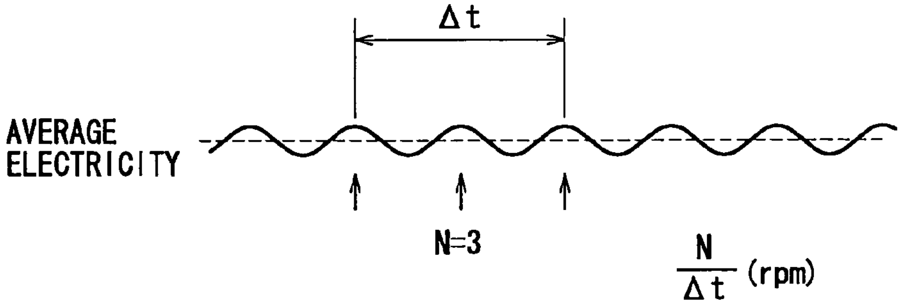

LEAKAGE DETECTING DEVICE FOR EVAPORATING FUEL PROCESSING APPARATUS

CROSS REFERENCE TO RELATED APPLICATIONS

This application is based on and incorporates herein by reference Japanese Patent Application No. 2004-214798 filed on Jul. 22, 2004.

FIELD OF THE INVENTION

The present invention relates to a leakage detecting device for an evaporating fuel processing apparatus. More particularly, the evaporating fuel processing apparatus is preferably used for a vehicular internal combustion engine or the like.

BACKGROUND OF THE INVENTION

In recent years, emission control is being tightened in view of conservation of environment. Specifically, an amount of fuel, which evaporates in a fuel system such as a ventilation apparatus and leaks to the outside, is regulated, as well as an amount of exhaust gas emitted from a vehicular internal combustion engine or the like. According to the regulation defined by the Environment Protection Agency (EPA) and the California Air Resource Board (CARB) in United States, it is required to detect vapor of fuel leaking through a small opening (leakage hole) in a fuel tank.

According to U.S. Pat. No. 5,890,474 (JP-A-10-90107) and US20040000187A1 (JP-A-2004-28060), a conventional leakage detecting device for an evaporating fuel processing apparatus has a ventilation apparatus that includes a fuel tank, a canister serving as an absorbing filter, and a purge control valve.

The inside of the ventilation apparatus is pressurized or de-pressurized using a pump to generate pressure difference with respect to the outside thereof. In this situation, pressure varies in the ventilation apparatus, and this pressure variation is compared with a reference pressure variation, which corresponds to a reference leakage hole, so that leakage arising in the ventilation apparatus is determined.

According to U.S. Pat. No. 5,890,474, an electric pump pressurizes to produce the reference pressure variation. The reference pressure variation and the pressure variation in the ventilation apparatus are detected in accordance with load fluctuation in a motor that drives the electric pump. Voltage applied to the motor or rotation speed of the motor is detected as the load fluctuation in the motor.

According to US20040000187A1, a brushless motor is used in an electric pump to enhance the lifetime of the electric pump. This structure includes a first intake circuit, which intermediately has the reference leakage hole, and a second intake circuit, which communicates with the ventilation apparatus. Positive pressure or negative pressure generated using the electric pump is switched between the first intake circuit and the second intake circuit using the switching valve. The reference pressure variation and the pressure variation in the ventilation apparatus are alternatively detected using the switching valve, so that a period needed for detecting leakage in the ventilation apparatus can be reduced.

However, in the above conventional structures, the fuel tank is pressurized or de-pressurized when leakage in the ventilation apparatus is detected. Accordingly, a pressure range in the pressurizing or the de-pressurizing using the electric pump is limited for protecting the fuel tank and for accurately detecting leakage in accordance with the pressure variation. The discharge performance of the electric pump varies due to aging, and varies corresponding to temperature characteristic of the motor. Accordingly, the pressure variation may not be limited within the pressure range due to the variation in the discharge performance. Leakage detection may be quickly switched from detecting the reference pressure variation to detecting the pressure variation in the ventilation apparatus alternatively in this order using the switching valve, for example. However, even in this case, the discharge performance of the electric pump may vary corresponding to the temperature characteristic of the motor while detecting the reference pressure variation and detecting the pressure variation in the ventilation apparatus.

Besides, when voltage of a vehicular battery varies, discharge performance of the electric pump may vary. Accordingly, the electric pump may be operated by controlling power supply at a constant voltage. However, even in this case, the discharge performance needs to be initially adjusted within a small pressure range in an assembling process such that the pressure variation is limited within the pressure range in an actual operation.

SUMMARY OF THE INVENTION

In view of the foregoing and other problems, it is an object of the present invention to provide a leakage detecting device, which applies pressurizing force or de-pressurizing force using an electrical pump to detect leakage, wherein variation in discharge performance of the electric pump due to aging, temperature characteristic of a motor, and the like can be restricted from exerting influence against accuracy in detection of leakage.

It is another object of the present invention to provide the leakage detecting device, wherein degree of freedom in initial assembling of the electric pump can be enhanced.

According to one aspect of the present invention, a leakage detecting device connects with an evaporating fuel processing apparatus. The leakage detecting device detects leakage of evaporating fuel in a ventilation apparatus that includes a fuel tank and a filter. The filter absorbs fuel evaporating in the fuel tank. The leakage detecting device includes an electric pump that includes a pump portion and a motor portion. The pump portion is capable of generating at least one of pressurizing force and de-pressurizing force. The motor portion drives the pump portion. The electric pump produces pressure difference between the inside of the ventilation apparatus and the outside of the ventilation apparatus in accordance with the at least one of the pressurizing force and the de-pressurizing force to detect a leakage condition of the ventilation apparatus. The leakage detecting device further includes a rotation speed controlling means that controls rotation speed of the motor portion at a predetermined rotation speed.

Thereby, even when variation arises in discharge performance of the electric pump due to aging, temperature characteristic of a motor, and the like, such variation can be restricted from exerting influence against accuracy in detection of leakage.

BRIEF DESCRIPTION OF THE DRAWINGS

The above and other objects, features and advantages of the present invention will become more apparent from the following detailed description made with reference to the accompanying drawings. In the drawings:

FIG. 5 is a graph showing variation in pressure detected using a pressure sensor when leakage is detected in the ventilation apparatus according to the first embodiment;

FIG. 6 is a table showing an operating condition of a motor portion and a switching valve according to the first embodiment; and FIG. 7 is a graph showing a characteristic in electricity supplied to the motor portion according to a modified embodiment in the present invention.

DETAILED DESCRIPTION OF PREFERRED EMBODIMENTS

First Embodiment

Figure 1:
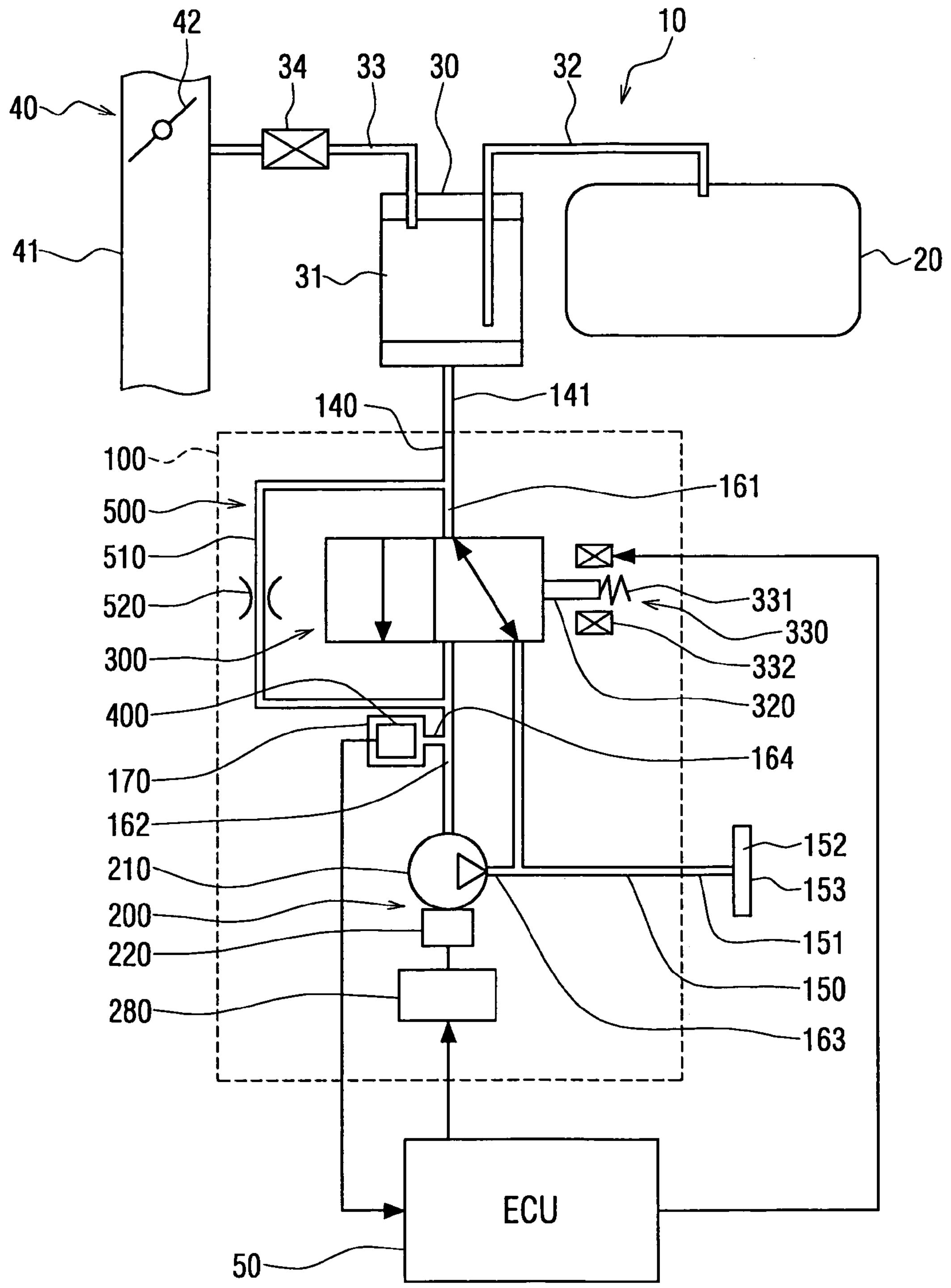
FIG. 1 is a schematic view showing a leakage detecting device for an evaporating fuel processing apparatus according to a first embodiment of the present invention.

An evaporating fuel processing apparatus shown in FIG. 1 is mounted to an internal combustion engine of a vehicle, for example. The evaporating fuel processing apparatus includes a fuel tank 20, a canister 30 serving as an absorbing filter, and a purge valve serving as a purge control valve. The evaporating fuel processing apparatus restricts fuel evaporating in a fuel tank 20 from diffusing to the atmosphere. The fuel tank 20 is connected with the canister 30 via a connecting pipe (tank passage) 32, so that the fuel tank 20 normally communicates with the canister 32. The canister 32 is filled with an absorbent 31, which temporarily absorbs evaporating fuel in the fuel tank 20. The canister 30 connects with an intake device 40, specifically an intake pipe 41, via a valve pipe (purge passage) 33. The purge passage 33 has a purge valve 34. The purge valve 34 opens and closes, so that evaporating fuel, air and the like flowing through the purge passage 33 is drawn and blocked. When the purge valve 34 opens, the canister 30 communicates with the intake pipe 41.

The absorbent 31 includes an absorbing material such as active charcoal. Fuel evaporating in the fuel tank 20 passes through the canister 30, so that the evaporating fuel is absorbed in the absorbent 31. Thereby, concentration of evaporating fuel contained in air, which flows out of the canister 30, becomes lower than a predetermined concentration.

The purge valve 34 is a solenoid valve, which communicates and blocks flow of vapor, which contains evaporating fuel and air. An ECU (electronic control unit) 50 serves as a control means that controls various components such as a fuel injection device of the engine. The opening degree of the purge valve 34 is controlled by the ECU 50 using a duty control or the like. Evaporating fuel is removed from the absorbent 31, and is purged into the intake pipe 41 by negative pressure in the intake pipe 41, in accordance with the opening degree of the purge valve 34. The evaporating fuel is burned with fuel injected from an injector, which is the fuel injection device (not shown).

A ventilation vessel defines a space that is capable of accommodating vapor such as evaporating fuel among the fuel tank, the canister, and the purge valve to be communicated with each other. In this situation, the purge valve 34 is in the closing condition. The ventilation vessel, which includes the fuel tank and the canister, constructs a ventilation apparatus that restricts fuel evaporating in the fuel tank 20 from diffusing to the atmosphere. When the purge valve 34 is in the closing condition, only a ventilation pipe (canister passage) 141 is capable of communicating with the atmosphere.

The canister passage 141, which opens to the atmosphere, is connected to the canister 30. The canister passage 141 is capable of connecting with a leakage detecting module 100. In the leakage detecting module 100 shown in FIGS. 1 to 4, the components constructing the leakage detecting module 100 are modularized. However, the components of the leakage detecting module 100 may be separately provided to be individual from each other. In this embodiment, the leakage detecting module 100 has the modularized structure.

As shown in FIG. 1, the leakage detecting device 10 is constructed of the ventilation apparatus that includes the leakage detecting module 100, the ECU 50, the fuel tank 20, and the canister 30. The leakage detecting device 10 is capable of examining whether leakage arises in the ventilation apparatus or not. As referred to FIGS. 1 to 4, the leakage detecting module 100 is constructed of an electric pump 200, a switching valve 300, a reference orifice 520, and a pressure sensor 400. The electric pump 200 includes a pump portion 210 and a motor portion 220. The pressure sensor 400 serves as a pressure detecting means. As referred to FIG. 4, the electric pump 200, the switching valve 300, the reference orifice 520, and the pressure sensor 400 are accommodated in a housing 110 to be modularized. The leakage detecting module 100 is preferably arranged upwardly relative to the fuel tank 20 and the canister 30. Thereby, liquid such as fuel and vapor can be restricted from intruding into the leakage detecting module 100 from the fuel tank 20 through the canister 30.

The housing 110 includes a housing body 111, a housing cover 112, and a housing piece 113. The housing 110 serves as an accommodating portion, which defines an accommodating space, in which the modularized components are accommodated. The housing 110 mainly includes a pump accommodating portion 120 and a switching valve accommodating portion. The electric pump 200 is accommodated the pump accommodating portion 120, and the switching valve 300 is accommodated in the switching valve accommodating portion. The housing 110 includes a canister port 140 and an atmospheric port 150. The housing 110 is capable of connecting with the ventilation apparatus, specifically the canister 30, through the canister port 140. The housing 110 opens to the atmosphere through the atmospheric port 150. The canister port 140 and the atmospheric port 150 are formed in the housing body 111.

As referred to FIGS. 1 to 4, the canister port 140 is connected with the canister passage 141, so that the canister port 140 communicates with the canister 30. As referred to FIG. 1, the atmospheric port 150 is connected with an atmospheric passage 151. The atmospheric passage 151 has an opening end 153 on the side opposite to the leakage detecting module 100. An air filter 152 is provided to the opening end 153. That is, the atmospheric passage 151 opens to the atmosphere on the side opposite to the leakage detecting module 100 through the opening end 153 and the air filter 152.

Figure 4:
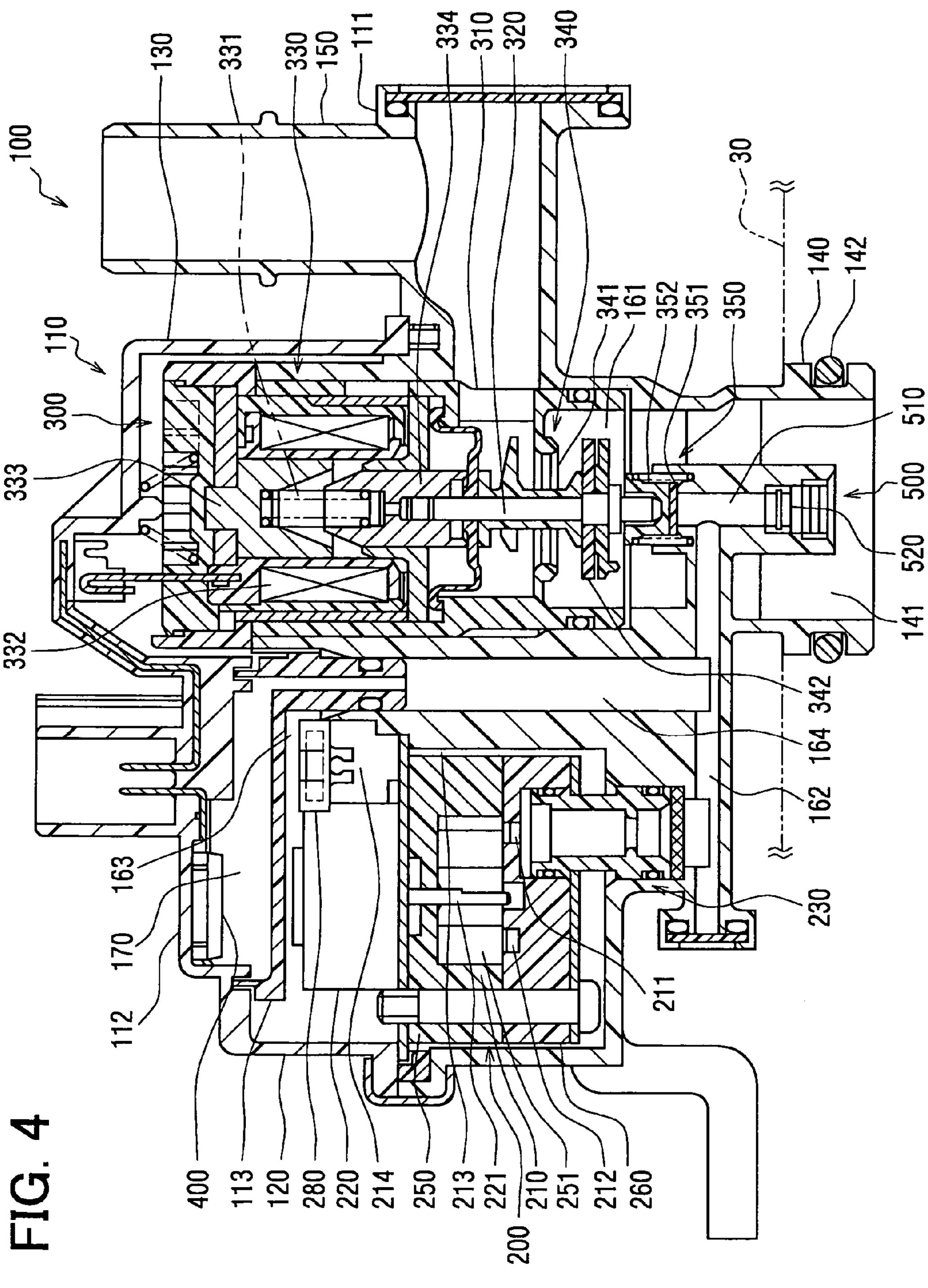
FIG. 4 is a cross-sectional view showing a leakage detecting module of the leakage detecting device according to the first embodiment.

As referred to FIG. 4, specifically the housing 110 includes a connecting passage 161, a pump passage (intake passage) 162, an exhaust passage 163, a pressure introducing passage 164, and a sensor chamber 170. The connecting passage 161 connects the canister port 140 with the atmospheric port 150 (FIG. 1). The pump passage 162 connects the connecting passage 161 with an inlet port 211 of the pump portion 210, which constructs the electric pump 200. The exhaust passage 163 connects an outlet port 212 of the pump portion 210 with the atmospheric port 150 (FIG. 1). The pressure introducing passage 164 branches from the pump passage 162, and connects the pump passage 162 with the sensor chamber 170. The pressure sensor 400 is accommodated in the sensor chamber 170. The sensor chamber 170 communicates with the pressure introducing passage 164, so that pressure in the sensor chamber 170 becomes substantially the same as pressure in the pump passage 162.

The exhaust passage 163 is formed between the electric pump 200 and the housing 110 in the pump accommodating portion 120. The exhaust passage 163 is formed between the switching valve 300 and the housing 110 in the switching valve accommodating portion 130. Specifically, the pump portion 210 and the housing 110 form a gap space 213 therebetween, and the motor portion 220 and the housing 110 form a gap space 214 therebetween. The switching valve 300 and the housing 110 form a gap space (not shown) therebetween. Air is discharged from the outlet port 212 of the pump portion 210, and the discharged air is exhausted to the atmospheric port 150 through the gap spaces 213, 214. Here, the exhaust passage 163, which includes the gap spaces 213, 214, forms an air outlet passage, through which air flows from the outlet port 212 of the pump portion 210.

As referred to FIG. 4, the housing 110 is provided with a reference orifice portion 500 on the side of the canister port 140. The reference orifice portion 500 has a reference pipe (orifice passage) 510 that branches from the canister port 140. The orifice passage 510 connects the canister port 140 with the pump passage 162. The reference orifice 520 is arranged in the orifice passage 510. The reference orifice 520 has an opening that corresponds to a specific area of an opening (leakage hole), through which a specific allowable amount of vapor, which includes fuel evaporating from the fuel tank 20, may leak. For example, according to the regulation defined by the Environment Protection Agency (EPA) in United States and the California Air Resource Board (CARB) in United States, an accuracy in detecting leakage of vapor, which includes fuel evaporating in the fuel tank 20, is required such that vapor, which leaks from a circular leakage hole having the diameter being substantially 0.5 mm, is detected.

Therefore, the reference orifice 520, which is arranged in the orifice passage 510, has an opening, which has an area equivalent to a circle having the diameter, which is equal to or less than 0.5 mm, for example. In this embodiment, the reference orifice 520 has an opening area equivalent to a circle, which is 0.45 mm in diameter. The orifice passage 510 is provided to the inner periphery of the canister port 140. Thus, the housing 110 has a dual-annular structure, which includes the connecting passage 161 on the outer side and the orifice passage 510 on the inner side.

The electric pump 200 includes the pump portion 210 and the motor portion 220. The pump portion 210 is capable of pressurizing or de-pressurizing air. The motor portion 220 drives the pump portion 210 to generate pressurizing force or de-pressurizing force. The pump portion 210 has a positive-displacement type pumping structure such as a vane type pumping structure. The pump portion 210 may have a variable positive displacement type pumping structure. In this embodiment, the pump portion 210 has a vane type pumping structure. In this structure, eccentricity (not shown) of a vane 251 is adjusted in the assembling thereof, so that eccentricity can be increased or decreased, so that the discharge capacity, which is one of a pumping performance, of the pump portion 210 can be can be increased or decreased. When the discharge capacity is tuned into a predetermined range, a setting range in an initial assembling process needs to be in a narrow range. Specifically, the range of the eccentricity in the assembling process needs to be set in a narrow range, for example.

As referred to FIG. 4, the pump portion 210 is accommodated in the pump accommodating portion 120. The pump portion 210 has the inlet port 211 and the outlet port 212. The inlet port 211 opens to the pump passage 162. The outlet port 212 opens to the exhaust passage 163. A cylindrical member 230, which is in a substantially cylindrical shape, is provided to the pump portion 210 on the side of the inlet port 211. The cylindrical member 230 is provided on the side, in which the pump portion 210 communicates with the pump passage 162, for positioning the pump portion 210 in the pump accommodating portion 120. The cylindrical member 230 defines a passage, through which the pump passage 162 communicates with the inlet port 211. An air filter is provided to the end of the cylindrical member 230 on the side of the pump passage 162. Another air filter may be provided to the end of the cylindrical member 230 on the side of the pump portion 210.

The pump portion 210 includes a pump housing 250 and a pump case 260. The pump portion 210 includes the vane 251, which is rotated in the pump housing 250. The vane 251 rotates, so that air is drawn from the inlet port 211, and the air is discharged from the outlet port 212. In this embodiment, the pump portion 210 serves as a de-pressurizing pump, which reduces pressure in the fuel tank 20 through the canister 30.

The motor portion 220 is mounted to the pump portion 210. The motor portion 220 has a structure of a brushless motor. The motor portion 220 may have any structures of motors such as DC motors. In this embodiment, the motor portion 220 is a brushless motor. The motor portion 220 has a shaft 221, which is secured to the vane 251 of the pump portion 210. The motor portion 220 is a brushless motor, so that the motor portion 220 is capable of changing a position, through which a coil (magnetic pole) such as an armature (not shown) of the motor portion 220 is supplied with electricity. The brushless motor does not have a brush, which electrically connects with the rotatable armature. That is, the brushless motor is an electrically noncontact DC motor.

The motor portion 220 is connected with a driving control circuit 280, which serves as a driving device. The driving control circuit 280 controls a power supply (power supply means), which supplies electric power to the motor portion 220. Therefore, the driving device (driving control circuit) 280 is controlled, so that the armature is rotated. Specifically, the driving control circuit 280 drives the armature of the motor portion 220 in accordance with driving signal such as a duty signal, which is output from the ECU 50. In this structure, supply of electricity is controlled in accordance with the magnetic pole. Therefore, the driving control circuit 280 includes an element such as a zener diode and a hall element (not shown), which may generate heat.

As referred to FIG. 4, the driving control circuit 280 is preferably arranged in the gap space 214, which partially defines the exhaust passage 163, so that the driving control circuit 280 can be cooled by flow of air discharged from the pump portion 210.

The switching valve 300 includes a valve body 310, a valve shaft 320, and a solenoid 330. The valve body 310 is accommodated in the switching valve accommodating portion 130 of the housing 110. The switching valve 300 has a first valve portion 340 and a second valve portion 350. The first valve portion 340 includes a first valve seat 341 and a washer 342. The first valve seat 341 is formed in the valve body 310. The washer 342 is mounted to the valve shaft 320, and serves as a valve body, which is capable of departing from and seating onto the first valve seat 341. The second valve portion 350 is constructed of a second valve seat 351 and a valve cap 352. The second valve seat 351 is formed in the housing 110. The valve cap 352 is mounted to an end of the valve shaft 320 on the side of the canister 30, and is capable of departing from and seating onto the second valve seat 351.

The valve shaft 320 is operated by the solenoid 330. The washer 342 is arranged on the axially intermediate portion of the valve shaft 320. The valve cap 352 is arranged on the axially end portion of the valve shaft 320. The solenoid 330 includes a movable core 334, a coil 332, and a spring 331. The movable core 334 is connected, e.g., secured to the valve shaft 320, so that the movable core 334 is capable of axially moving in conjunction with the valve shaft 320. The coil 332 generates electromagnetic force to magnetically attract the movable core 334. The spring 331 serves as a biasing means. As referred to FIG. 1, the coil 332 is electrically connected with the ECU 50, so that that ECU 50 controls energizing state of the coil 332. The spring 331 biases the movable core 334, i.e., the valve shaft 320 to the side of the second valve seat 351.

When the coil 332 is de-energized, the coil 332 does not generate electromagnetic force, and magnetic attractive force is not applied to the movable core 334. Thus, the valve shaft 320 axially moves downward in FIG. 4. In this situation, the valve cap 352 seats onto the second valve seat 351, so that the connecting passage 161 is isolated from the pump passage 162 through the second valve seat 351. Besides, in this situation, the washer 342 departs from the first valve seat 341, so that the canister port 140 communicates with the atmospheric port 150 through the connecting passage 161. As a result, when the coil 332 is not supplied with electricity, airflow is blocked between the canister port 140 and the pump passage 162 through the second valve seat 351, and airflow is permitted between the canister port 140 and the atmospheric port 150.

When the ECU 50 controls the coil 332 to be energized, the coil 332 generates electromagnetic force, so that magnetic attractive force is applied to the movable core 334. Thus, the movable core 334 and the valve shaft 320 axially move upward in FIG. 4 against bias, i.e., resilience of the spring 331. In this situation, the valve cap 352 departs from the second valve seat 351, and the washer 342 seats onto the first valve seat 341. Thus, the connecting passage 161 communicates with the pump passage 162 through the second valve seat 351. Besides, in this situation, the canister port 140 is isolated from the atmospheric port 150. As a result, when the coil 332 is supplied with electricity, airflow is permitted between the canister port 140 and the pump passage 162 through the second valve seat 351, and airflow is blocked between the canister port 140 and the atmospheric port 150. Here, the orifice passage 510 and the pump passage are regularly communicated with each other regardless of the energizing and de-energizing states of the coil 332.

As referred to FIG. 4, the pressure sensor 400 is accommodated in the sensor chamber 170, which is formed in the housing 110. The pressure sensor 400 detects pressure in the sensor chamber 170, so that the pressure sensor 400 outputs a sensor signal, which corresponds to pressure detected using the pressure sensor 400, to the ECU 50. The sensor chamber 170 communicates with the pump passage 162 through the pressure introducing passage 164. Therefore, pressure detected using the pressure sensor 400 becomes substantially the same as pressure in the pump passage 162. The pressure sensor 400 is arranged in the sensor chamber 170, which is apart from the pump passage 162. The sensor chamber 170 and the pressure introducing passage 164 have a volume that is capable of being a dampener for the pressure sensor 40. In this structure, pulsation in pressure caused by the pump portion 210 may be restricted from exerting influence to the pressure sensor 40, compared with a structure, in which the pressure sensor 400 is arranged in the vicinity of the inlet port 211 of the pump portion 210.

The ECU (electronic control unit) 50 is constructed of a microcomputer that includes a CPU, a storage device such as a memory, an input circuit, an output circuit, and a power circuit. The CPU executes control processings, calculations, and the like. The memory such as a ROM and a RAM stores data for various programs. The ECU 50 inputs various signals transmitted from various sensors provided to the vehicle. The signals include a pressure signal, a rotation speed signal of the pump portion 210, a current signal, a control signal of the driving control circuit 280, and an OFF signal of an ignition switch. The pressure signal is transmitted from the pressure sensor. The rotation speed signal of the pump 210 is controlled by the driving control circuit 280. The current signal indicates an amount of current supplied to the motor portion 220. The control signal of the driving control circuit 280 is such as a ripple in an electrical characteristic. The OFF signal of the ignition switch is used for evaluating a key-OFF state.

The ECU 50 controls various components in accordance with predetermined control programs stored in the ROM and various input signals. The ECU 50 outputs an operation signal to the driving control circuit 280 for correcting rotation speed of the motor portion 220 in accordance with the sensor signal, specifically a reference pressure Pr in the B zone shown in FIG. 5, for example. The ECU 50 transmits signals for opening and closing the switching valve 300 in accordance with a progress in a leakage detecting process. The ECU 50 controls the motor portion 220 via the driving control circuit 280. The ECU 50 opens and closes the switching valve 300. Alternatively, the ECU 50 controls ON and OFF states of the switching valve 300 shown in FIG. 6.

Specifically, the ECU 50 executes a leakage detection control program stored in the ROM. The leakage detection control program includes a reference pressure difference detecting means (reference detecting means) shown by steps S702, S703 in FIG. 3, a rotation speed controlling means shown by steps S704 to S707, a rotation speed storing means shown by step S708, and a leakage detecting means shown by steps S710 to S712. The leakage detecting means detects leakage in the ventilation apparatus at a stored rotation speed.

The reference detecting means pressurizes or de-pressurizes in the ventilation apparatus using the pump portion 210 of the electric pump 200, so that reference pressure difference is generated between the inside of the ventilation apparatus and the outside thereof. Thus, the reference detecting means detects the reference pressure difference. In this embodiment, the inside of the ventilation apparatus is de-pressurized using the pump portion 210, and the reference pressure difference is equivalent to the reference pressure Pr, which is negative pressure shown in FIG. 5.

In the following description, the reference pressure Pr indicates the reference pressure difference, a set pressure Pa indicates a predetermined pressure difference as a target value, and a check pressure Pc indicates pressure difference in the ventilation apparatus.

The rotation speed controlling means corrects a rotation speed Nm of the motor portion 220 such that the detected reference pressure Pr coincides with the set pressure Pa. Specifically, the rotation speed controlling means compares the reference pressure Pr with the set pressure Pa. When $Pr<Pa$, the rotation speed controlling means increases the rotation speed Nm by a correction value $\Delta N$, specifically, $Nm=Nm+\Delta N$. When $Pr>Pa$, the rotation speed controlling means decreases the rotation speed Nm by the correction value $\Delta N$, specifically, $Nm=Nm-\Delta N$. Here, $\Delta N>0$. The rotation speed controlling means detects the rotation speed Nm of the motor portion 220 of the electric pump 200. In this embodiment, the brushless motor is used as the electric pump 200, so that the ECU 50 determines the rotation speed of the motor portion 220 in accordance with a rotation speed signal in the driving control circuit 280 that controls the brushless motor, for example.

Specifically, the rotation speed controlling means performs operation such as a PWM (pulse width modulation) control with respect to electricity supplied to a winding corresponding to the magnetic pole of the brushless motor, using the driving control circuit 280, for example. Thus, the rotation speed controlling means is capable of performing a rotation speed control, i.e., a revolution control with respect to the electric pump 200.

The rotation speed storing means stores the rotation speed Nm as a detecting rotation speed Nma, when the reference pressure Pr coincides the set pressure Pa using the rotation speed controlling means. The pumping performance of the pump portion 210 may vary due to aging in the pumping portion 210 of the electric pump 200. Additionally, the pumping performance of the pump portion 210 may vary corresponding to the temperature characteristic of the motor portion 220. The pressure is corrected to the constant pressure, specifically the set pressure corresponding to the predetermined discharge capacity, so that variation in the pumping performance is balanced out, and the pressure is regularly compensated to the constant set pressure, even when the pumping performance varies due to aging and variation in temperature of the electric pump 200. Therefore, influences caused by aging in the pump portion 210 and the temperature characteristic of the motor portion 220 are capable of being absorbed.

Specifically, the aging in the pumping portion 210 relates to a variation in driving power of the pump until sliding members such as the vane 251 fit to each other. More specifically, the sliding members, which generate pressurizing force and de-pressurizing force of the pump portion 210, initially abut to each other, and cause friction with each other in an initial operating step of the pump after factory shipment thereof. The driving power of the electric pump 200 varies while the sliding members fit to each other in the initial operating step. Additionally, the aging in the pumping portion 210 relates to deterioration in the pumping performance caused by abrasion in the sliding members after operating for a long cumulative period.

In addition, the temperature characteristic of the motor portion 220 exerts influence as follows. When leakage is detected for examining failure in the ventilation apparatus, the pump passage 162 is de-pressurized using the pump portion 210 through the reference orifice 520 to detect the reference pressure Pr, alternatively the ventilation apparatus is directly de-pressurized to detect the check pressure Pc in the ventilation apparatus. In this situation, the passage is switched using the switching valve 300. While the reference pressure Pr and the check pressure Pc are detected, the motor portion 220 of the electric pump 200 is operated. As a result, temperature in the motor portion 220 increases in a period from the beginning of detecting the reference pressure Pr until detecting the check pressure Pc. As a result, the motor efficiency of the electric motor 20 may decrease corresponding to the temperature characteristic of the motor portion 220, and pumping performance of the electric pump 200 may vary.

However, in this embodiment, the leakage detecting means generates de-pressurizing pressure using the pump portion 210 at the stored detecting rotation speed, and applies the de-pressurizing pressure into the ventilation apparatus, so that the leakage detecting means detects the check pressure Pc in the ventilation apparatus. The de-pressurizing force of the pump portion 210 is regularly controlled at the predetermined discharge capacity to generate the set pressure Pa, in this embodiment.

Next, the operation of the leakage detecting device 10 is described in reference to FIGS. 1, 2, 3, 5, and 6.

Figure 2:
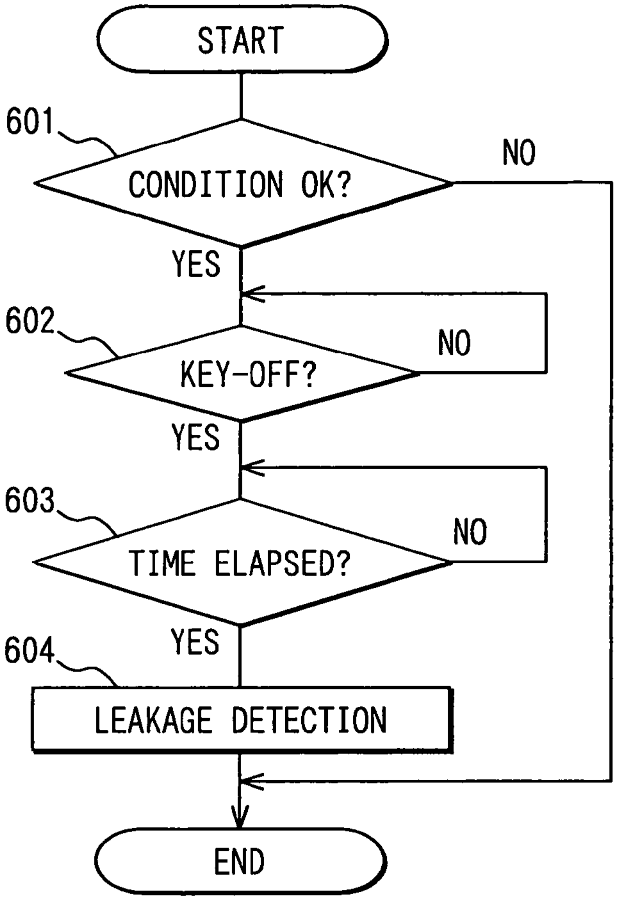
FIG. 2 is a flowchart showing a routine for evaluating a starting condition of detecting leakage in a ventilation apparatus according to the first embodiment.

As referred to FIG. 2, in step S601, it is evaluated whether a condition for detecting leakage is satisfied. The condition for detecting leakage is satisfied when the vehicle is operated for more than a predetermined period, and when the atmospheric temperature is more than the predetermined temperature, for example. According to the OBD regulation in the United States, the conditions for detecting leakage are described as follows. Specifically, the atmospheric temperature is equal to or greater than 20° F., and the vehicle is driven for more than 600 seconds at an altitude less than 800 feet. Alternatively, the vehicle is driven at a speed equal to or greater than 25 miles per hour cumulatively for 300 seconds. Alternatively, the vehicle is in an idling operation continuously for 30 second or more. When the conditions for detecting leakage are not satisfied in step S601, the routine is terminated. Alternatively, when the conditions for detecting leakage are satisfied in step S601, the routine proceeds to step S602.

In step S602, it is evaluated whether the ignition key is turned OFF to be in the key-OFF state. When the ignition key is turned ON, the routine repeatedly returns to step 602 to be in a key-OFF waiting state, in which the ignition key is waited for being turned OFF. When a positive determination is made in step S602, the routine proceeds to step S603, in which it is evaluated whether a predetermined time elapsed after the ignition key is turned OFF. Specifically, liquid level of fuel may vary in the fuel tank 20, and temperature of fuel may be unstable immediately after turning the ignition key OFF. As a result, the condition of air (condition in evaporation system) including evaporating fuel in the ventilation apparatus becomes unstable. In this situation, it is not in a proper condition to execute the leakage detection of the ventilation apparatus. Therefore, the leakage detection of the ventilation apparatus is not executed immediately after turning the ignition key OFF. The predetermined time is a standard period, in which the condition in evaporation system changes from the unstable condition immediately after turning the ignition key OFF to a stable condition, in which the leakage detection is capable of being properly performed. When a negative determination is made in step S603, the routine repeatedly returns to step S603 while waiting for elapsing the predetermined time.

When a positive determination is made in step S603 after elapsing the predetermined time, the routine proceeds to step S604, in which the leakage detection (leakage detection control) is executed. Subsequently, the routine terminates.

Next, the operation of the leakage detection control executed in step S604 is specifically described in reference to FIGS. 3 to 6.

Figure 3:
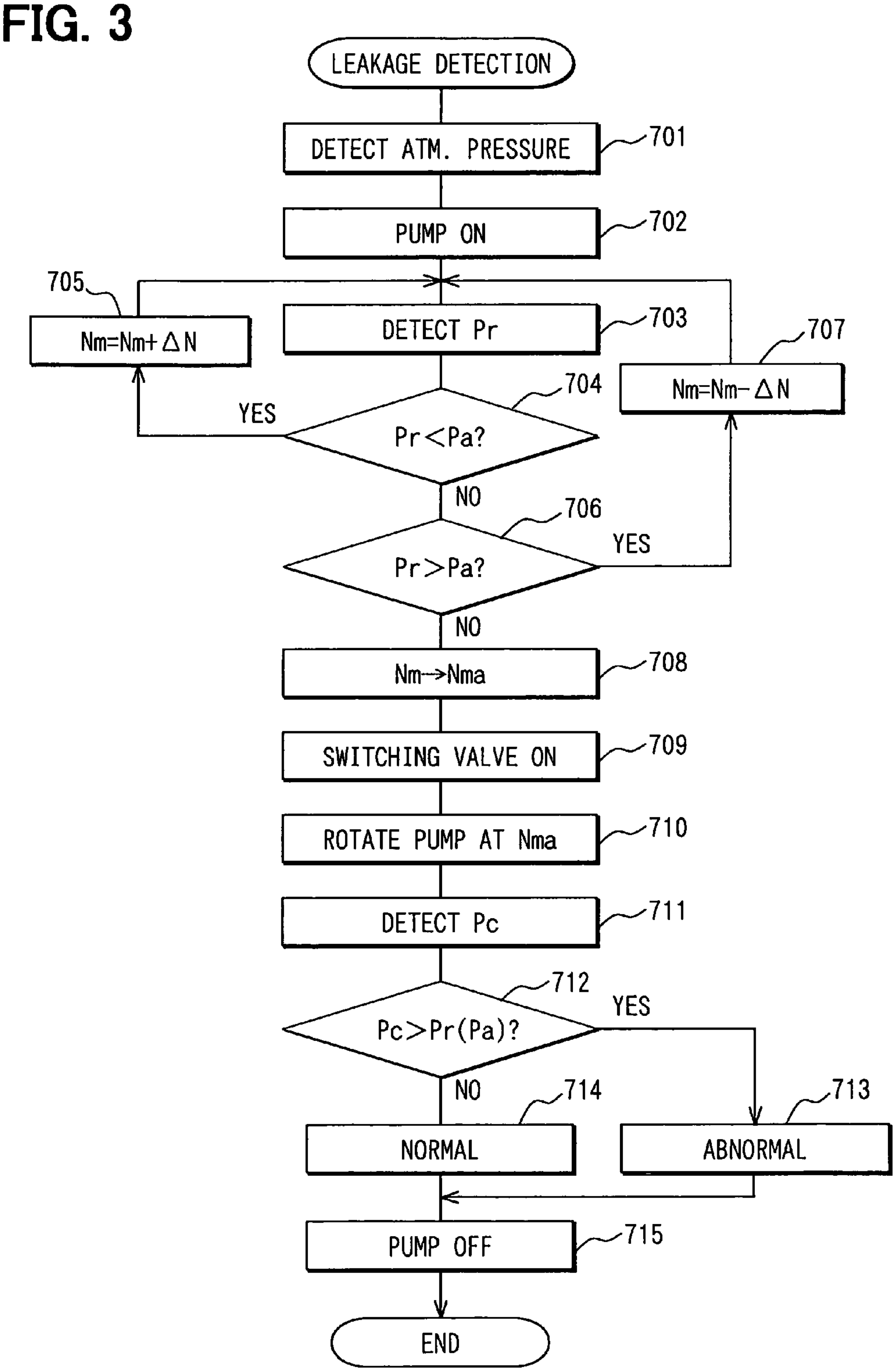
FIG. 3 is a flowchart showing a main routine for detecting leakage in the ventilation apparatus according to the first embodiment.

As referred to FIG. 3, in step S701, the ECU 50 detects the atmospheric pressure using the pressure sensor 400. In this embodiment, leakage of air including evaporating fuel is detected in accordance with variation in difference between the reference pressure Pr and the check pressure Pc. Specifically, the atmospheric pressure around the leakage detecting module 100 of the vehicle is detected in advance of detecting the reference pressure Pr and the check pressure Pc for reducing influence of the atmospheric pressure varying corresponding to the altitude. This process is an atmospheric pressure detecting process represented by A in FIGS. 5, 6. In this situation, the motor portion 220 and the switching valve 300 are de-energized. Specifically, the coil 332 of the switching valve 300 is not supplied with electricity, so that the atmospheric port 150 communicates with the pump passage 162 through the orifice passage 510. The sensor chamber 170, in which the pressure sensor 400 is arranged, communicates with the pump passage 162 through the pressure introducing passage 164, so that the pressure sensor 400 detects pressure, which is substantially equivalent to the atmospheric pressure.

The sensor signal transmitted from the pressure sensor 400 is preferably a voltage ratio signal, a duty ratio signal, or a bit signal. Thereby, influence of noise arising in electric drivers such as the solenoid 330 around the pressure sensor 400 can be reduced, so that accuracy in detection using the pressure sensor 400 can be maintained.

In steps S702 to S708, a condition for generating the reference pressure Pr is set for evaluating the leakage condition under the check pressure Pc. This process is a reference pressure setting process represented by B in FIGS. 5, 6. In this process, the motor portion 220 is turned ON, and the switching valve 300 is maintained being turned OFF. In S702, the ECU 50 supplies electricity to the motor portion 220 of the electric motor 200 to rotate the motor portion 220. Specifically, the ECU 50 controls the driving control circuit 280 to operate the motor portion 220, which is the brushless motor, so that the motor portion 220 rotates at a constant rotation speed. The motor portion 220 generates driving force corresponding to the constant rotation speed, so that the pump portion 210 of the electric pump 200 produces a constant discharge capacity to generate the constant reference pressure Pr.

In step S703, the ECU 50 detects the reference pressure Pr using the pressure sensor 400 in a condition, in which the motor portion 220 rotates at the constant rotation speed. The routine proceeds to steps S704 to S706, in which it is evaluated whether the reference pressure Pr detected using the pressure sensor 400 coincides with the set pressure Pa, which is a threshold for detecting the reference pressure Pr. More specifically, it is evaluated whether the reference pressure Pr is less than the set pressure Pa, i.e., Pr<Pa in step S704, and it is evaluated whether the reference pressure Pr is greater than the set pressure Pa, i.e., Pr>Pa in step S706. When a positive determination is made in step S704, specifically Pr<Pa, the routine proceeds to step S705, in which the rotation speed Nm of the motor portion 220 is corrected to the positive side, specifically Nm=Nm+ΔN. When a positive determination is made in step S706, specifically Pr>Pa, the routine proceeds to step S707, in which the rotation speed Nm of the motor portion 220 is corrected to the negative side, specifically Nm=Nm−ΔN. The routine in steps S705 and S707 corrects the rotation speed Nm of the motor portion 220 such that the reference pressure Pr coincides with the set pressure Pa. When negative determinations are made in steps S704 and S706, it is determined that the reference pressure Pr coincides with the set pressure Pa, so that the routine proceeds to step S708.

In step S708, the ECU 50 stores the rotation speed Nm, when the reference pressure Pr coincides with the set pressure Pa, as the detecting rotation speed Nma to the memory such as the RAM. The ECU 50 reads the detecting rotation speed Nma stored in the memory, and controls the motor portion 220 at the detecting rotation speed Nma, so that the electric pump 200 regularly produces the predetermined discharge capacity to generate the reference pressure Pr, which coincides with the set pressure Pa.

In the routine in steps S709 and S714, the ECU 50 controls the motor portion 220 rotated at the stored detecting rotation speed Nma, so that the pump portion 210 is rotated at the detecting rotation speed Nma to generate negative pressure applied to the inside of the ventilation apparatus. The ventilation apparatus is the object to be detected the leakage condition thereof. Thus, the check pressure Pc is generated in the ventilation apparatus to be compared with the reference pressure Pr for evaluating whether leakage arises in the ventilation apparatus. The reference pressure Pr coincides with the set pressure Pa. This process is a leakage detection process represented by C in FIGS. 5, 6. In this process, the motor portion 220 is maintained being turned ON, and the switching valve 300 is turned ON. Specifically, in step S709, the ECU 50 supplies electricity to the coil 332 of the switching valve 330, so that the switching valve 330 is energized. Thereby, airflow is switched and permitted between the canister port 140 and the pump passage 162 through the second valve seat 351, and airflow is switched and blocked between the canister port 140 and the atmospheric port 150. In this situation, the leakage condition is switched from a reference leakage condition to a check leakage condition. The reference pressure Pr is generated through the reference orifice 520 in the reference leakage condition. The check pressure Pc is applied to the ventilation apparatus in the check leakage condition.

In step S710, the ECU 50 controls the motor portion 220 of the electric pump 200 to rotate at the stored detecting rotation speed Nma. The routine proceeds to step S711, in which the check pressure Pc is detected. In S710, the pump portion 210 of the electric pump 200 regularly produces the predetermined discharge capacity, which is capable of generating the reference pressure Pr, which coincides with the set pressure Pa. In this condition, the ECU 50 detects the check pressure Pc in the ventilation apparatus using the pressure sensor 400 in the check leakage condition.

In step S712, it is evaluated whether the check pressure Pc detected in step S711 is greater than the reference pressure Pr, i.e., Pc>Pr. When a positive determination is made in step S712, specifically Pc>Pr, the routine proceeds to step S713, in which leakage is determined to be large as shown by the characteristic of the check pressure Pc in FIG. 5. In this case, a leakage hole may exist in a component such as the fuel tank of the ventilation apparatus, and it is determined to be abnormal. On the contrary, when a negative determination is made in step S712, the routine proceeds to step S714, in which leakage is determined to be small as shown by the characteristic of the check pressure Pc in FIG. 5. In this case, it is determined that at least large leakage does not arise in the ventilation apparatus, and determined to be normal. When it is determined to be normal in step S714, an indication lamp (MIL lamp) of a vehicular indication device is turned OFF. The MIL lamp serves as an information means. When it is determined to be abnormal in step S713, the MIL lamp is turned ON to notify the disorder to a passenger such as the driver.

In this embodiment, the negative pressure Pc, Pr are compared with each other. However, pressure differences Pc, Pr may be compared with each other, instead of the negative pressure Pc, Pr. In this case, in step S712, it is determined whether the pressure difference Pc is less than the reference pressure difference Pr, i.e., Pc<Pr.

Immediately after determination of leakage in the ventilation apparatus through the routine of steps S709 to S714, the ECU 50 stops supplying electricity to the motor portion 220 of the electric pump 200 to stop the electric pump 200. Alternatively, the routine may terminate when pressure detected using the pressure sensor 400 recovers to the atmospheric pressure, for example. This process is a determination fixing process represented by D in FIGS. 5, 6. In this process, the motor portion 220 is turned OFF, and the switching valve 300 is turned OFF.

Next, an effect of this embodiment is described.

The leakage detecting device depressurizes the inside the ventilation apparatus including the fuel tank 20 using the electric pump 200 including the pump portion n210 and the motor portion 220 to generate pressure difference between the inside of the ventilation apparatus and the outside thereof for detecting leakage in the ventilation apparatus. In this embodiment, the pressure difference is the check pressure Pc, which is negative pressure.

The leakage detecting device includes the reference detecting means and the rotation speed controlling means. The reference detecting means applies the negative pressure using the electric pump 200 to generate the reference pressure difference through the reference orifice 520 for comparing the reference pressure difference with the check pressure Pc. In this embodiment, the reference pressure difference is the reference pressure Pr, which is negative pressure. The rotation speed controlling means S704 to S707 corrects the rotation speed Nm of the motor portion 220 such that the reference pressure Pr, which is detected, coincides with the predetermined pressure difference. In this embodiment, the predetermined pressure difference is the set pressure Pa.

In this structure, the reference pressure Pr, which is compared with the check pressure Pc, can be regularly controlled at the set pressure Pa, which is a constant pressure difference, so that influence due to aging of the pump portion 210 and temperature characteristic of the motor portion 220 can be absorbed. Thereby, the discharge performance of the electric pump 200 can be restricted from causing a variation in detection of leakage, so that accuracy in detection of leakage can be maintained.

In this embodiment, the rotation speed Nm is corrected using the rotation speed controlling means, so that the corrected rotation speed Nm is stored as the detecting rotation speed Nma using the rotation speed storing means S708. Thereby, the electric pump 200 is capable of regularly generating the predetermined set pressure Pa. Therefore, when the leakage condition of the ventilation apparatus is detected, the de-pressurizing force generated using the pump portion 210 of the electric pump 200 is adjusted such that the discharge capacity of the electric pump 200 is controlled at a predetermined discharge capacity corresponding to the predetermined set pressure Pa. Subsequently, the check pressure Pc in the ventilation apparatus is detected, so that the check pressure Pc, which represents the leakage condition of the ventilation apparatus, can be precisely detected. Thus, the reference pressure Pr (Pr=Pa) can be stably generated, and the leakage condition is stably detected in the condition, in which the electric pump 200 regularly produces the discharge capacity corresponding to the reference pressure Pr. Thereby, accuracy in detecting leakage can be enhanced.

The detecting rotation speed Nma is a set condition for generating the reference pressure Pr (Pr=Pa) in a stable condition. In this embodiment, the leakage detecting means S710 to S712 generates de-pressurizing force using the pump portion 210 at the detecting rotation speed Nma, which is stored in the memory. The de-pressurizing force is applied to the inside of the ventilation apparatus, so that the check pressure Pc is generated in the ventilation apparatus, and the check pressure Pc is detected.

The motor portion 220 includes the brushless motor serving as a motor body and the driving control circuit 280 that controls the brushless motor. The rotation speed controlling means S704 to S707 preferably controls the driving control circuit 280 such that the detected reference pressure Pr coincides with the set pressure Pa. When a brushless motor is used in the motor portion 220, the leakage detecting device uses the driving control circuit 280 to control rotation of the motor portion 220. Therefore, even when a rotation control circuit or the like is not additionally provided, the driving control circuit 280 can be controlled. For example, a pulse-width modulation control (PWM control) is performed to electricity supply to a winding, which corresponds to a magnetic pole in an armature of the brushless motor or the like, so that rotation speed, i.e., revolution of the motor portion 220 can be controlled.

The leakage detecting device 10 includes the fuel tank 20 and the canister 30. In this embodiment, leakage detecting device 10 preferably further includes the leakage detecting module that includes the reference pipe 510, the switching valve 300, and the electric pump 200. The reference pipe 510 includes the reference orifice 520 midway thereof for detecting the reference leakage condition. The switching valve 300 is capable of connecting the reference pipe 510 with the ventilation pipe (canister passage) 141 of the canister 30 to be in parallel with each other. The switching valve 300 alternatively switches between the reference pipe 510 and the ventilation pipe 141 to alternatively switch between the reference leakage condition, in which the reference pressure difference is generated, and the leakage condition, in which leakage in the ventilation apparatus is detected. Thereby, variations in performances in the pump portion 210 and the motor portion 220 due to aging thereof can be absorbed. Besides, the electric pump 200 being apt to be exerted influence due to the temperature characteristic of the motor portion 220, the reference orifice 520, and the switching valve 300 can be integrally modularized. Thereby, variation in discharge performance of the electric pump 200 due to aging, temperature characteristic of the motor portion 220, and the like can be restricted from exerting influence against accuracy in detection of leakage.

In this embodiment, the pressure sensor 400 is preferably arranged in one of an exhaust passage 163 and an intake passage 162, which introduces air including evaporating fuel into the electric pump 200, in the leakage detecting module. In general, the electric pump 200 increases in temperature due to pressurizing and de-pressurizing. When the pressure sensor 400 is provided in the vicinity of the electric pump 200, specifically the electric pump 200 and the pressure sensor 400 are modularized, heat generated in the electric pump 200 exerts influence against the temperature characteristic of the pressure sensor 400. As a result, pressure such as the reference pressure Pr and the check pressure Pc detected using the pressure sensor 400 may cause an error.

In this embodiment, the pressure sensor 400 is arranged in the air intake passage, specifically the pressure introducing passage 164. The pressure introducing passage 164 connects with the pump passage 161, which introduces air to the electric pump 200, so that airflow can be generated around the pressure sensor 400. Therefore, airflow can be restricted from staying around the pressure sensor 400. Thus, the pressure sensor 400 can be cooled, so that the pressure sensor 400 can be restricted from causing an error corresponding to the temperature characteristic of the pressure sensor 400. Alternatively, the pressure sensor 400 can be arranged in an air exhaust passage, instead of being arranged in the air intake passage.

In this embodiment, the pump portion 210 has the inlet port 211 and the outlet port 212. The pump portion 210 connects with the air intake passage. The outlet port 212 connects with the air exhaust passage. The pressure sensor 400 is preferably arranged being separated from the inlet port 211 for a predetermined distance. In general, airflow drawn into the pump portion 210 of the electric pump 200 and airflow exhausted from the pump portion 210 may pulsate. Specifically, pressure varies in the airflow at a regular interval. When the pressure sensor 400 is arranged in the vicinity of the inlet port 211 of the pump portion 210, pulsation of the electric pump 200 may exert influence to detection performed using the pressure sensor 400. As a result, accuracy in detection of the pressure sensor 400 may be degraded.

On the contrary, in this embodiment, the pressure sensor 400 is arranged in the pressure introducing passage 164, which branches from the pump passage 161 connected to the inlet port 211, such that the pressure sensor 400 is away from the inlet port 211 for a predetermined length. Thus, pulsation of the electric pump 200 hard to exert influence against the pressure sensor 400.

In this embodiment, the pressure sensor 400 is preferably arranged on the side opposite to the inlet port 211 relative to the motor portion 220 with respect to the axial direction of the motor portion 220. Thereby, influence due to pulsation arising in the inlet port 211 of the pump portion 211 can be reduced, so that accuracy in the leakage detection can be enhanced.

In this embodiment, the driving control circuit 280 is arranged in the leakage detecting module 100 to operate the motor portion 220. The driving control circuit 280 is preferably arranged in the air exhaust passage, specifically in the gap space 214, in this embodiment. For example, when the driving control circuit 280 is provided to the motor portion 220 for controlling the motor portion 220, the motor portion 220 is controlled using a switching element, which produces heat, in general. Specifically, electric current supplied to the motor portion 220 or electric voltage applied to the motor portion 220 is controlled in such a manner as a pulse-width modulation control or the like. In this case, the driving control circuit 280 may heat while driving the motor portion 220. However, in this embodiment, the driving control circuit 280 is arranged in the gap space 214, which forms the air exhaust passage, so that the heating driving control circuit 280 can be cooled by air.

Modified Embodiment

In the above embodiment, a brushless motor 220 is used in the motor portion 220 as the motor body, and the brushless motor is controlled using the driving control circuit 280. However, the motor body of the motor portion 220 is not limited to the brushless motor, and may be another type of motor such as a DC motor.

The leakage detecting device 10 may include a power supply means, an electrical characteristic detecting means, and a determining means. The power supply means supplies electricity to the motor portion 220. The driving control circuit 280 may be used as the power supply means. The electrical characteristic detecting means detects an electrical characteristic of the motor portion 220, which is energized. The determining means detects the ripple shown in FIG. 7 in the electrical characteristic of the motor portion 220.

FIG. 7 depicts the electrical characteristic of the motor portion 220 including a ripple. The ripple corresponds to a magnetic pole of the motor portion 220. The determining means determines the rotation speed Nm of the motor portion 220 in accordance with the ripple.

The number of the waves (peaks) of the ripples in a wave-shape in the electric characteristic corresponds to the number of magnetic poles of the armature in the motor portion 220. Therefore, rotation speed Nm of the motor portion 220 can be calculated in accordance with the number of the peaks N for one rotation of the motor portion 220 and time $\Delta t$ for the number of peaks N. That is, $Nm=N/\Delta t$ (rpm). In this embodiment, the number of peaks N is 3.

The rotation speed Nm of the motor portion 220 determined by the determining means can be the rotation speed of the motor portion 220 detected by the rotation speed controlling means in the above embodiment. In this structure, rotation speed can be controlled in a DC motor or the like.

In the above embodiment, the rotation speed Nm is corrected such as the reference pressure Pr coincides with the predetermined set pressure Pa. However, the leakage detecting device 10 may include an electricity correcting means that corrects electric current or electric voltage supplied to the motor portion 220 such that the reference pressure Pr coincides with the predetermined set pressure Pa. The reference pressure Pr is detected using the pressure sensor 400 and the reference detecting means. In this structure, electric current or electric voltage supplied to the motor portion 220 is controlled. Thereby, the discharge capacity of the electric pump 200 can be controlled such that the reference pressure Pr coincides with the predetermined set pressure Pa, even when a driving control device 280, which can control the rotation speed in accordance with the magnetic pole of a brushless motor, is not provided.

In the above embodiment, the electric pump 200 generates negative pressure in the ventilation apparatus to form the pressure difference. However, the electric pump 200 may generate positive pressure in the ventilation apparatus to form the pressure difference.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

The structures of the above embodiments can be combined as appropriate. Various modifications and alternations may be diversely made to the above embodiments without departing from the spirit of the present invention.

What is claimed is:

1. A leakage detecting device for an evaporating fuel processing apparatus, the leakage detecting device detecting leakage of evaporating fuel in a ventilation apparatus that includes a fuel tank and a filter, the filter absorbing fuel evaporating in the fuel tank, the leakage detecting device comprising:

an electric pump that includes a motor portion and a pump portion for generating at least one of pressurizing force and de-pressurizing force, wherein the electric pump produces a pressure difference between an inside of the ventilation apparatus and an outside of the ventilation apparatus in accordance with said at least one of pressurizing force and de-pressurizing force to detect a leakage condition of the ventilation apparatus, the leakage detecting device further comprising:

rotation speed controlling means for controlling rotation speed of the motor portion;

a pressure detecting means that is connected between the electric pump and the fuel tank, and is adapted to detecting pressure in the ventilation apparatus and the pressure difference; and a reference detecting means for detecting a reference pressure difference which is produced using the electric pump to generate the at least one of pressurizing force and de-pressurizing force through a reference orifice, wherein the rotation speed controlling means detects rotation speed of the motor portion, and the rotation speed controlling means corrects the rotation speed of the motor portion such that the reference pressure difference coincides with a predetermined pressure difference, and the leakage detecting device further comprising:

rotation speed storing means for storing the rotation speed of the motor portion, which is corrected by the rotation speed controlling means, as a detecting rotation speed, wherein the rotation speed of the motor portion is controlled at the detecting rotation speed when the leakage condition of the ventilation apparatus is detected.

2. The leakage detecting device according to claim 1, wherein the motor portion includes a brushless motor and a driving device, the driving device controlling the brushless motor, and the rotation speed controlling means controls the driving device such that the reference pressure difference, which is detected using the reference detecting means, coincides with the predetermined pressure difference.

3. The leakage detecting device according to claim 1, further comprising:

power supply means for supplying electricity to the motor portion;

electrical characteristic detecting means for detecting an electrical characteristic of the motor portion, which is energized; and determining means for detecting a ripple in the electrical characteristic of the motor portion, the ripple corresponding to a magnetic pole of the motor portion, the determining means determining the rotation speed of the motor portion in accordance with the ripple, wherein the rotation speed of the motor portion determined by the determining means is the rotation speed of the motor portion detected by the rotation speed controlling means.

4. The leakage detecting device according to claim 3, further comprising:

electricity correcting means for correcting electricity supplied to the motor portion such that the reference pressure difference, which is detected using the reference detecting means, coincides with the predetermined pressure difference.

5. The leakage detecting device according to claim 1, wherein the filter connects to the fuel tank through a connecting pipe, and the filter includes a ventilation pipe, through which the filter is capable of communicating with atmosphere, the leakage detecting device further comprising:

a leakage detecting module that includes a reference pipe, a switching valve, and the electric pump, wherein a reference pipe includes the reference orifice midway thereof for detecting a reference leakage condition, the switching valve is capable of connecting the reference pipe with the ventilation pipe to be in parallel with each other, and the switching valve alternatively switches between the reference pipe and the ventilation pipe to alternatively switch between the reference leakage condition, which corresponds to the reference pressure difference, and the leakage condition, in which leakage in the ventilation apparatus is detected.

6. The leakage detecting device according to claim 5, wherein the pressure detecting means is a pressure sensor, the leakage detecting module includes the pressure sensor, the pressure sensor is arranged in one of an exhaust passage and an intake passage, and the intake passage introduces vapor to the electric pump.

7. The leakage detecting device according to claim 6, wherein the pump portion has an inlet port and an outlet port, the inlet port connects with the intake passage, the outlet port connects with the exhaust passage, and the pressure sensor is arranged to be apart from the inlet port for a predetermined distance.

8. The leakage detecting device according to claim 7, wherein the pressure sensor is arranged on a side opposite to the inlet port with respect to the motor portion in an axial direction of the motor portion.

9. The leakage detecting device according to claim 5, wherein the leakage detecting module includes the driving device that controls the motor portion, and the driving device is arranged in the exhaust passage, through which the electric pump discharges vapor.

10. A leakage detecting device for an evaporating fuel processing apparatus, to detect leakage of evaporating fuel in a ventilation apparatus that includes a fuel tank and a filter for absorbing fuel evaporating in the fuel tank, the leakage detecting device comprising:

an electric pump that includes a motor portion and a pump portion for generating at least one of pressurizing force and de-pressurizing force, wherein the electric pump produces a pressure difference between an inside of the ventilation apparatus and an outside of the ventilation apparatus in accordance with said at least one of pressurizing force and de-pressurizing force to detect a leakage condition of the ventilation apparatus;

a rotation speed controller that controls rotation speed of the motor portion;

a pressure detector that is connected between the electric pump and the fuel tank for detecting pressure in the ventilation apparatus and said pressure difference; and a reference detector that detects a reference pressure difference which is produced using the electric pump to generate said at least one of pressurizing force and de-pressurizing force through a reference orifice, wherein the rotation speed controller detects rotation speed of the motor and corrects the rotation speed of the motor so that the reference pressure difference coincides with a predetermined pressure difference, and the leakage detecting device further comprising:

a rotation speed storage that stores the rotation speed of the motor portion, which is corrected by the rotation speed controller, as a detecting rotation speed, wherein the rotation speed of the motor portion is controlled at the detecting rotation speed when the leakage condition of the ventilation apparatus is detected.

11. The leakage detecting device according to claim 10, further comprising:

a rotation speed storage device that stores the rotation speed of the motor portion, which is corrected by the rotation speed controller, as detecting rotation speed, wherein the rotation speed of the motor portion is controlled at the detecting rotation speed when the leakage condition of the ventilation apparatus is detected.

12. The leakage detecting device according to claim 10, wherein the motor portion includes a brushless motor and a driving device, the driving device controlling the brushless motor, and a rotation speed controller controls the driving force such that the reference pressure difference, which is detected using the reference pressure difference detector, coincides with the predetermined pressure difference.

13. A method of detecting leakage of evaporating fuel in a ventilation apparatus that includes a fuel tank and a filter for absorbing fuel evaporating in the fuel tank, the method comprising:

generating at least one of pressurizing force and de-pressurizing force with an electric pump that includes a motor portion and a pump portion, wherein the electric pump produces a pressure difference between an inside of the ventilation apparatus and an outside of the ventilation apparatus in accordance with said at least one of pressurizing force and de-pressurizing force to detect a leakage condition of the ventilation apparatus;

detecting pressure in the ventilation apparatus using a pressure sensor connected between the electric pump and the fuel tank;

detecting said pressure difference in accordance with said pressure in the ventilation apparatus;

detecting a reference pressure difference which is produced using the electric pump to generate said at least one of pressurizing force and de-pressurizing force through a reference orifice;

detecting rotation speed of the motor and controlling the rotation speed of the motor portion such that the reference pressure difference coincides with a predetermined pressure difference; and storing the rotation speed of the motor portion as a detecting rotation speed, wherein the rotation speed of the motor portion is controlled at the detecting rotation speed when the leakage condition of the ventilation apparatus is detected.

14. The method as in claim 13, further comprising storing the rotation speed of the motor portion as detecting rotation speed, wherein the rotation speed of the motor portion is controlled at the detecting rotation speed wherein the leakage condition of the ventilation apparatus is detected.

15. The leakage detecting device according to claim 1, wherein the pressure detecting means communicates with a pump passage, which connects the electric pump with the ventilation apparatus, and the electric pump is adapted to drawing fuel vapor from the fuel tank through the pump passage.

16. The leakage detecting device according to claim 1, wherein the pressure detecting means selectively communicates with the fuel tank, and the pressure detector is adapted to detect pressure in the fuel tank.

17. The leakage detecting device according to claim 10, wherein the pressure detector communicates with a pump passage, which connects the electric pump with the ventilation apparatus, and the electric pump is adapted to drawing fuel vapor from the fuel tank through the pump passage.

18. The leakage detecting device according to claim 10, wherein the pressure detector selectively communicates with the fuel tank, and the pressure detector is adapted to detect pressure in the fuel tank.

19. The method according to claim 13, wherein pressure in the ventilation apparatus is detected in accordance with pressure in a pump passage, which connects the electric pump with the ventilation apparatus, and the electric pump is adapted to drawing fuel vapor from the fuel tank through the pump passage.

20. The method according to claim 13, wherein the pressure detecting means selectively communicates with the fuel tank, and the pressure detector is adapted to detect pressure in the fuel tank.

* * * * *